United States Patent [19]

Schmid et al.

[11] 4,246,366

[45] Jan. 20, 1981

[54] MIXTURES OF GLYCIDYLATED HYDANTOINS AND POLYHYDRIC PHENOLS AND THE USE THEREOF FOR THE PREPARATION OF PLASTICS

[75] Inventors: Rolf Schmid, Gelterkinden, Switzerland; André Schmitter, Hegenheim, France; Ferdinand Gutekunst, Riehen; Friedrich Lohse, Oberwil, both of Switzerland

[73] Assignee: Ciba-Geigy Corporation, Ardsley, N.Y.

[21] Appl. No.: 47,954

[22] Filed: Jun. 11, 1979

[30] Foreign Application Priority Data

Jun. 22, 1978 [CH] Switzerland ......................... 6820/78

[51] Int. Cl.$^3$ ...................... C08G 59/26; C08G 59/62
[52] U.S. Cl. .................................... 521/178; 210/654; 528/88; 528/93; 528/94; 528/95
[58] Field of Search ........................ 528/88, 93, 94, 95

[56] References Cited

U.S. PATENT DOCUMENTS

| | | | |
|---|---|---|---|
| 3,562,275 | 2/1971 | Habermeier et al. | 260/260 |
| 3,779,949 | 12/1973 | Porret et al. | 260/2 N |
| 3,925,407 | 12/1975 | Stockinger et al. | 260/309.5 |

*Primary Examiner*—Earl A. Nielsen
*Attorney, Agent, or Firm*—Harry Falber; Joseph F. DiPrima

[57] ABSTRACT

Mixtures of approximately equivalent amounts of (a) a glycidylated hydantoin and (b) a mononuclear phenol with 2 or 3 phenolic hydroxyl groups, at least one of the components (a) or (b) being trifunctional. They additionally contain a curing accelerator and on heating form mechanically good and flexible plastics which are stable to hydrolysis and can be used as building materials and foams, for the finishing and coating of textile material and for the preparation of water-permeable membranes.

16 Claims, No Drawings

MIXTURES OF GLYCIDYLATED HYDANTOINS AND POLYHYDRIC PHENOLS AND THE USE THEREOF FOR THE PREPARATION OF PLASTICS

The invention relates to a mixture of a glycidylated hydantoin and a polyhydric phenol, which can be used as a casting resin, a laminating resin and an impregnating resin and can be employed in the field of building materials and foams and the finishing or coating of textile fibres and also in the preparation of water-permeable membranes.

curing agent for this resin and a curing accelerator and comprises (a) as the resin, a N-glycidyl compound of a mononuclear or binuclear hydantoin, which has 2 or 3 glycidyl groups in the molecule and is free from ester groups, and
(b) as the curing agent, a mononuclear phenol with 2 or 3 phenolic hydroxyl groups, at least one of the components (a) or (b) being trifunctional and there being 0.5 to 1.1 equivalents of (b) per 1 equivalent of (a).

Component (a) is preferably a component of the formulae I, II, III, IV or V:

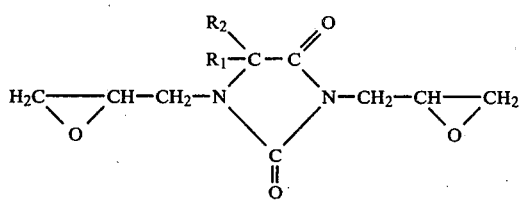
(I)

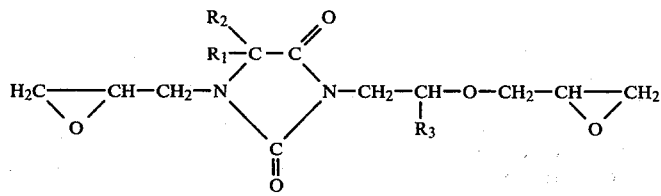
(II)

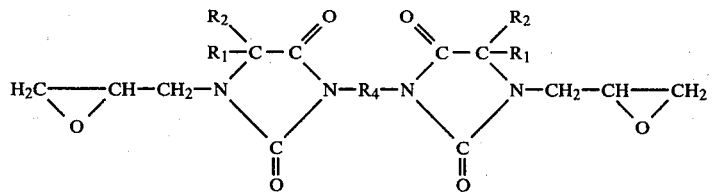
(III)

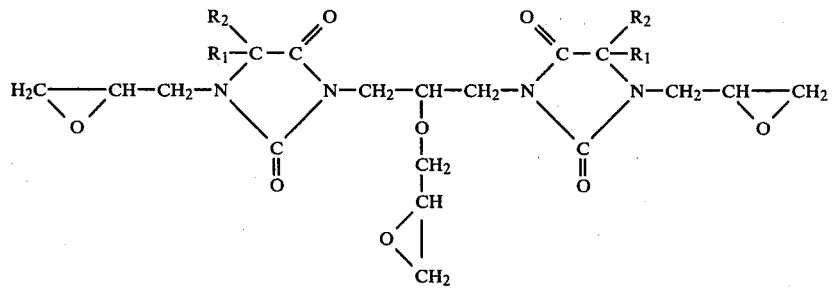
(IV)

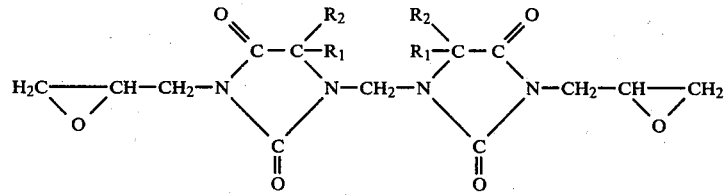
(V)

German Offenlegungsschrift No. 2,115,854 discloses systems which are based on triglycidyl isocyanurate and novolacs and are stable on storage and after curing give coatings with good mechanical properties. For many applications, such as the preparation of foams, the coating of textile material and the preparation of membranes, they are not suitable because the water-absorbing capacity is too low.

The mixture according to the invention eliminates this disadvantage. It contains a curable epoxide resin, a In these formulae, $R_1$ and $R_2$ independently of one another are methyl or ethyl or together are tetramethylene or pentamethylene, $R_3$ is hydrogen or methyl and $R_4$ is an alkylene group with 1 to 12 carbon atoms.

It is also possible to use a mixture of the compounds of the formulae I, II and III.

The resins (a) can be prepared in a manner known per se; in this context reference may be made to French Pat.

Nos. 1,530,771, 1,546,270 and 2,080,885 and "Angew. Makromolekulare Chemie 63, 63 et. seq. (1977)".

If the mixture contains substances of the formula I and II and/or of the formula III, it contains, as component (b), a compound with at least 3 phenolic hydroxyl groups, such as, preferably, a trisphenol, especially pyrogallol; however, phloroglucinol or hydroxyhydroquinone are also suitable.

If the mixture contains a compound of the formula IV, it also contains a compound with two or three phenolic hydroxyl groups, such as resorcinol, hydroquinone, pyrocatechol or 2,6-dihydroxytoluene.

The curing accelerators are in particular tertiary amines, such as imidazoles, such as 1-methylimidazole, quaternary ammonium salts, such as tetramethylammonium chloride, or alkali metal alcoholates, such as sodium ethylate.

To prepare the mixture, the resin and curing agent are preferably heated to a temperature at which rapid mixing is possible, i.e. up to temperatures of 150° C., this mixture is cooled and the curing accelerator is then added, preferably in the form of an aqueous solution, for example a 10 percent by weight aqueous solution. The mixture is de-aerated and dehydrated in vacuo before it is cured by heating to above 120° C. The curing time is a few seconds up to 2 days, depending on the material and the temperature. The resulting products, castings, laminates and impregnated articles are distinguished by high mechanical strength, good flexibility and stability to hydrolysis, even at high temperatures, and at the same time also show good permeability to water and are able to absorb relatively large amounts of moisture. When cast as films, such materials can also be used as osmosis membranes. If a blowing agent is added, the compositions are also suitable for the preparation of foams.

Blowing agents added to the mixtures in order to prepare the foam are those which are still solid at room temperature and have decomposition temperatures of between 80° and 220° C. These agents can be added on their own or as mixtures. Substances which can be used are sulfonyl-hydrazides, for example benzenesulfonyl hydrazide, p-toluenesulfonyl hydrazide or 4,4'-oxydibenzenesulfonyl hydrazide, and also substances such as azodicarboxamides, or $\alpha,\alpha'$-azoisobutyronitrile. Preferably, azodicarboxamide is used as the blowing agent. The density of the novel foams is largely determined by the weight ratio of the reaction mixture to the blowing agent; it can vary from 0.1 to 1.0. Preferably, 0.5–7% of blowing agent are used.

In order to obtain a homogeneous pore structure, a surfactant can also be added in amounts of 0.1% to 1%, based on the total amount of the reaction mixture. The mixture is usually introduced into a mould, which can be closed if necessary. Foaming, shaping and curing take place in an oven, preferably at 160°–200° C., in the course of about ½ an hour to 6 hours. The foamed article formed can be removed from the mould if it is dimensionally stable at the temperature employed. If necessary, it can be post-cured at the same temperature or at a higher temperature, in order thus to obtain more advantageous properties in use.

EXAMPLE 1

167 g (1.0 equivalent) of triglycidyl bis-hydantoin of the formula IV, in which $R_1$ and $R_2$ are each methyl, are mixed with 55.0 g (1.0 equivalent) of 1,3-dihydroxybenzene at 120° C.; 2.2 g of a 1 percent by weight aqueous solution of tetramethylammonium chloride (i.e. 0.01% of accelerator based on the amount of resin plus curing agent) are added and mixed in well. The mixture is subjected to a vacuum and is then poured into a pre-warmed mould made of an aluminium alloy containing magnesium and silicon. After heat treatment for 16 hours at 160° C., moulded sheets with the following characteristics are obtained:

| Flexural strength (VSM 77103) | = | 124 N/mm$^2$ |
|---|---|---|
| Deflection (VSM 77103) | = | 3.5 mm |
| Impact strength (VSM 77105) | = | 1.8 N.cm/mm$^2$ |
| Heat distortion point (ISO R 75) | = | 100° C. |
| Absorption of water at 23° C., 4 days | = | 2.7% |
| Absorption of boiling water in 1 hour | = | 3.4% |

EXAMPLE 2

167 g (1.0 equivalent) of triglycidyl bis-hydantoin of the formula IV, in which $R_1$ and $R_2$ are each methyl, are mixed with 37.8 g (0.9 equivalent) of 1,2,3-trihydroxybenzene at 120° C. and, after cooling, 0.2 g of 1-methylimidazole is added. The mixture is subjected to a vacuum and is then poured into a pre-warmed mould made of an aluminium alloy. After heat treatment for 16 hours at 160° C., moulded sheets with the following characteristics are obtained:

| Flexural strength (VSM 77103) | = | 166 N/mm$^2$ |
|---|---|---|
| Deflection (VSM 77103) | = | 7.8 mm |
| Impact strength (VSM 77105) | = | 1.9 N.cm/mm$^2$ |
| Heat distortion point (ISO R 75) | = | 137° C. |
| Absorption of water at 23° C., 4 days | = | 4.5% |
| Absorption of boiling water in 1 hour | = | 3.5% |

EXAMPLE 3

128 g (1.0 equivalent) of 1,3-diglycidyl-5,5-dimethylhydantoin are mixed with 42 g (1.0 equivalent) of 1,2,3-trihydroxybenzene at 120° C. After cooling, 1.7 g of a 1% aqueous solution of tetramethylammonium chloride are mixed in. The mixture is subjected to a vacuum and is then poured into a pre-warmed mould made of an aluminium alloy. After heat treatment for 16 hours at 180° C., moulded sheets with the following characteristics are obtained:

| Flexural strength (VSM 77103) | = | 148 N/mm$^2$ |
|---|---|---|
| Deflection (VSM 77103) | = | 6.3 mm |
| Impact strength (VSM 77105) | = | 1.1 N.cm/mm$^2$ |
| Heat distortion point (ISO R 75) | = | 116° C. |
| Absorption of water at 23° C., 4 days | = | 7.3% |
| Absorption of boiling | = | 4.4% |

EXAMPLE 4

195 g (1.0 equivalent) of 1,1'-methylene-bis-(3-glycidyl-5,5-dimethylhydantoin) are mixed with 37.8 g (0.9 equivalent) of 1,2,3-trihydroxybenzene at 150°–160° C. After cooling, 0.23 g of 1-methylimidazole is mixed in. The mixture is subjected to a vacuum and is then poured into a pre-warmed mould. After heat treatment for 16 hours at 160° C., moulded sheets with the following characteristics are obtained:

| Flexural strength (VSM 77103) | = | 130 N/mm² |
|---|---|---|
| Deflection (VSM 77103) | = | 4.0 mm |
| Impact strength (VSM 77105) | = | 1.4 N.cm/mm² |
| Heat distortion point (ISO R 75) | = | 149°0 C. |
| Absorption of water at 23° C., 4 days | = | 3.9% |
| Absorption of boiling water in 1 hour | = | 3.6% |

EXAMPLE 5

133 g (1.0 equivalent) of a mixture of 70% of 1,3-diglycidyl-5,5-dimethyl-hydantoin and 30% of a glycidyl compound of the formula III in which $R_1$ and $R_2$ are each methyl and $R_3$ is hydrogen are mixed with 37.8 g (0.9 equivalent) of 1,2,3-trihydroxybenzene at 130°–140° C. After cooling, 0.17 g of 1-methylimidazole is mixed in. The mixture is subjected to a vacuum and is then poured into a pre-warmed mould. After heat treatment for 16 hours at 160° C., moulded sheets with the following characteristics are obtained:

| Flexural strength (VSM 77103) | = | 164 N/mm² |
|---|---|---|
| Deflection (VSM 77103) | = | 13.4 mm |
| Impact strength (VSM 77105) | = | 1.7 N.cm/mm² |
| Heat distortion point (ISO R 75) | = | 112° C. |
| Absorption of water at 23° C., 4 days | = | 7.2% |
| Absorption of boiling water in 1 hour | = | 5.7% |

EXAMPLE 6

(a) 167 g of triglycidyl-bis-hydantoin, 55 g of 1,3-dihydroxybenzene and 0.5 g of a polysiloxane (Si 3193) are mixed for 30 minutes at 120° C. in a kneader. The temperature of the kneader is then adjusted to 100° C. and 9 g of azodicarboxamide as the blowing agent and 12 drops of 1-methylimidazole as the curing accelerator are then added. The mixture is kneaded for a further 3 hours at this temperature. A yellow resin which is still slightly tacky forms. The gel time measured on a gel time plate is 85 seconds at 180° C.

(b) 20 g of the resin are introduced at 160° C. into a mould with dimensions of 65×34×16 mm. The mould is closed and kept at 160° C. for 1 hour. After this time it is removed from the curing oven and, after cooling, the resulting foamed article with a density of 0.5 g/cm³ is taken out. After heat treatment at 120° C. for 16 hours, the following characteristics are measured:
Softening range TMS 1=113°–121° C.
Compressive strength=124.1 kg/cm²
The foam has a fine and regular pore structure.

(c) 10 g of the mixture prepared according to (a) are introduced into the mould described under (b), at 160° C. The mould is closed and the mixture is cured at 160° C. for 3 hours. After release from the mould, the foam has a density of 0.27 g/cm³. After post-curing for 16 hours, the following characteristics are measured:
Softening range=103°–128° C.
Compressive strength=38.6 kg/cm².

(d) 100 g of the resin prepared according to (a) are introduced into a mould which has dimensions of 130×140×20 mm and has been pre-warmed to 170° C. and the mould is then closed. After curing at 170° C. for 1 hour, the mould is removed from the oven and the foamed article is released from the mould. This article has a density of 0.27 g/cm³. After post-curing at 120° C. for 12 hours, the following characteristics are measured:
Softening range=108°–123° C.
Compressive strength=25.8 kg/cm².

EXAMPLE 7

(a) The following products are mixed in a kneader, the jacket temperature of which has been set at 100° C.: 128 g of 1,3-diglycidyl-5,5-dimethylhydantoin, 42 g of 1,2,3-trihydroxybenzene, 0.4 g of a polysiloxane (Si 3193), 8 g of azodicarboxamide and 0.4 g of methylimidazole. After a reaction time of 2 hours, during which so-called advancement takes place, the resin/curing agent mixture, which is still slightly tacky, is removed from the kneader. The mixture has a red-brown colour. The gel time at 180° C. is 90 seconds.

(b) 100 g of the mixture prepared according to (a) are introduced into a mould which has been pre-warmed to 170° C. The mould is closed and kept at this temperature for 2 hours. The resulting foam is then subjected to a heat after-treatment for 12 hours at 120° C. The following characteristics are measured: softening range 119°–127° C.; compressive strength 13.8 kg/cm²; density 0.27 g/cm³.

What is claimed is:

1. A mixture of a curable epoxide resin, a curing agent for the resin and a curing accelerator, which comprises
    (a) as the resin, a N-glycidyl compound of a mononuclear or binuclear hydantoin, which has two glycidyl groups in the molecule or a binuclear hydantoin, which has three glycidyl groups in the molecule and is free from ester groups, and
    (b) as the curing agent, a mononuclear phenol with two or three phenolic hydroxyl groups, at least one of the components (a) or (b) being tri-functional and there being 0.5 to 1.1 equivalents of (b) per 1 equivalent of (a).

2. A mixture according to claim 1, which contains, as the curing accelerator (c), a tertiary amine, an imidazole, an alkali metal alcoholate or a quaternary ammonium salt.

3. A mixture according to either of claim 1 or 2, which contains, as component (a), a hydantoin of the formula I, II, III or V

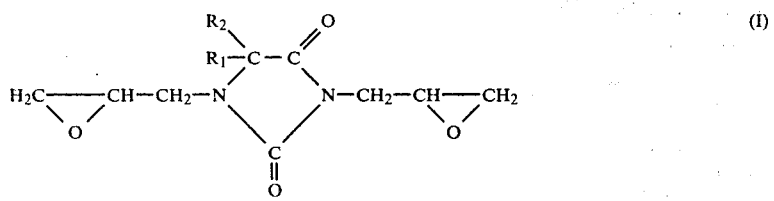

(I)

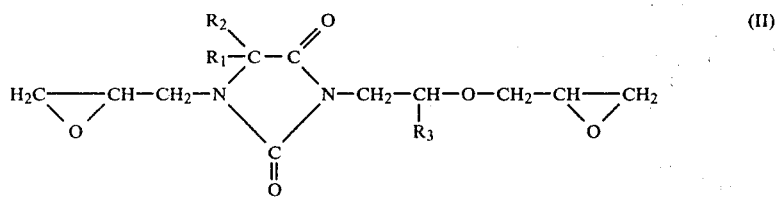

(II)

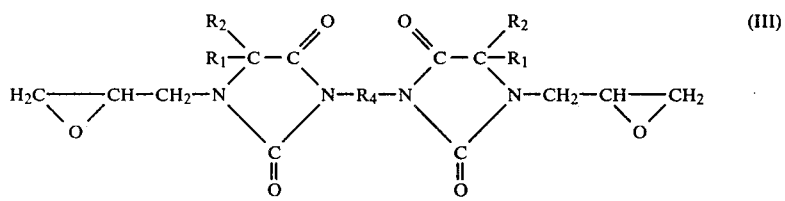

(III)

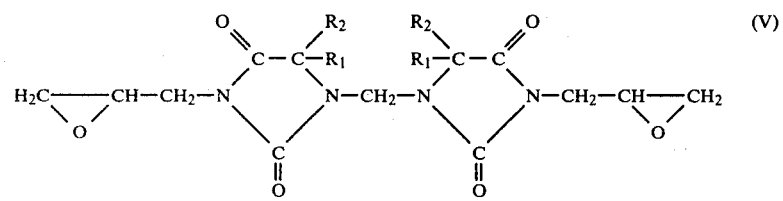

(V)

in which $R_1$ and $R_2$ independently of one another are methyl or ethyl or together are tetramethylene or pentamethylene, $R_3$ is hydrogen or methyl and $R_4$ is an alkylene group having 1 to 12 carbon atoms, especially a methylene group, or a mixture of hydantoins of the said formulae, and contains, as component (b), a compound with 3 phenolic hydroxyl groups.

4. A mixture according to claim 3, which contains a trisphenol as component (b).

5. A mixture according to claim 4, which contains pyrogallol as the trisphenol.

6. A mixture according to either of claim 1 or 2, which contains, as component (a), a hydantoin of the formula IV 7. A mixture according to any one of claims 1 to 6, in which there is 0.9 to 1.0 equivalent of component (b) per one equivalent of component (a).

8. A mixture according to claim 6, which comprises, as component (a), a hydantoin of the formula IV, in which $R_1$ and $R_2$ are each methyl, as component (b) 1 equivalent of 1,3-dihydroxybenzene per 1 equivalent of (a), and, as component (c), 0.01 g of tetramethylammonium chloride per 100 g of (a) and (b).

9. A mixture according to claim 6, which comprises, as component (a), a hydantoin of the formula IV, in which $R_1$ and $R_2$ are each methyl, as component (b), 0,9 equivalent of 1,2,3-trihydroxybenzene per 1 equivalent of (a), and 0.1 g of 1-methylimidazole per 100 g of (a) and (b).

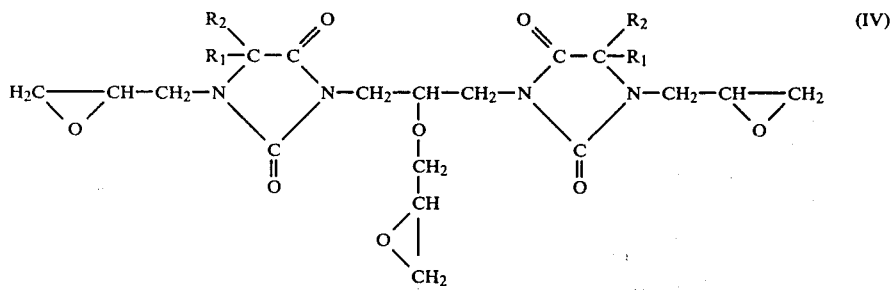

(IV)

in which $R_1$ and $R_2$ independently of one another are methyl or ethyl or together are tetramethylene or pentamethylene, and contains, as component (b), a mononuclear compound with 2 or 3 phenolic hydroxyl groups.

10. A mixture according to claim 3, which comprises, as component (a), a hydantoin of the formula I, in which $R_1$ and $R_2$ are each methyl, as component (b) 1 equivalent of 1,2,3-trihydroxybenzene per 1 equivalent of (a), and as component (c), 0.01 g of tetramethylammonium chloride per 100 g of (a) and (b).

11. A mixture according to claim 3, which comprises, as component (a), a hydantoin of the formula III, in which $R_1$ and $R_2$ are each methyl and $R_4$ is methylene, as component (b) 0.9 equivalent of 1,2,3-trihydroxybenzene per 1 equivalent of (a), and as component (c) 0.1 g of 1-methylimidazole per 100 g of (a) and (b).

12. A mixture according to claim 1, which additionally contains a blowing agent.

13. A process for the preparation of a cured product, which comprises allowing a mixture according to any one of claims 1 to 7 to react at a temperature of above 120° C.

14. A process according to claim 13, wherein, by casting, a film is prepared which after curing can be used as an osmosis membrane.

15. A plastic based on epoxide resin, which has been prepared from a mixture according to any one of claims 1 to 11.

16. A plastic according to claim 15, which forms an osmosis membrane.

* * * * *